Figure 1:
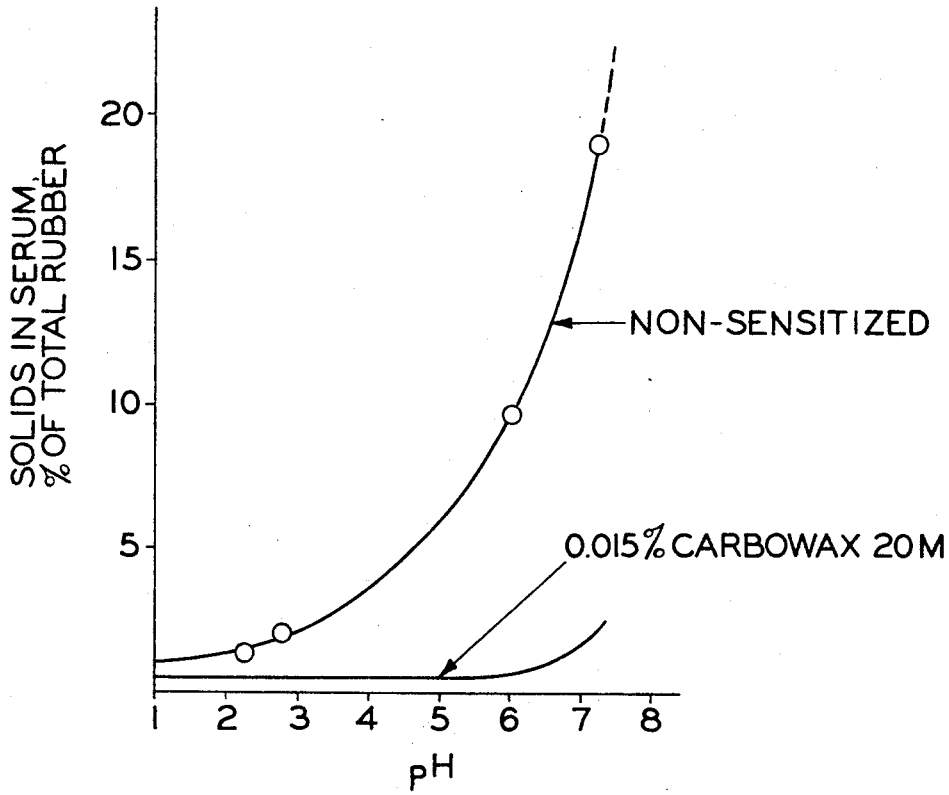
Figure 2:
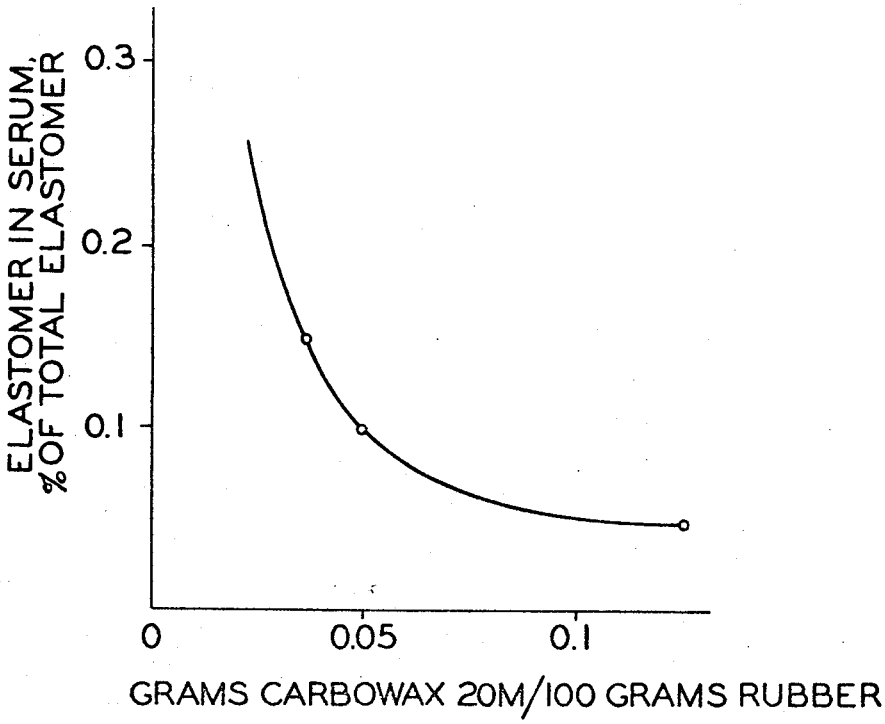

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED FEBRUARY 2, 1971

883 O.G. 11

T883,012

PROCESS FOR COAGULATING A LATEX OF AN ELASTOMER POLYMER

Ernst Schmidt and John H. Williams, Akron, Ohio, assignors to The Firestone Tire & Rubber Company, Akron, Ohio, a corporation of Ohio

Continuation of application Ser. No. 663,758, Aug. 28, 1967. This application May 1, 1970, Ser. No. 31,860
**Int. Cl. C08d *5/04;* C08f *1/92***
U.S. Cl. 260—85.1
1 Sheet Drawing. 9 Pages Specification

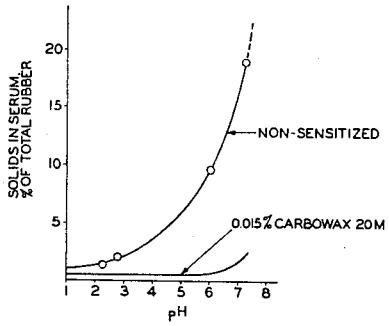

A latex of polybutadiene, polyisoprene, butadiene-styrene copolymer, butadiene-isoprene copolymer, butyl rubber, EPM rubber, EPDM rubber or an aqueous dispersion of reclaimed natural or synthetic rubber, stabilized with an acid-sensitive stabilizer, is coagulated usually at 130° to 140° F. by admixing an acid and/salt, e.g. sulfuric, acetic, formic or hydrochloric acid, aluminum sulfate, sodium chloride, zinc acetate, zinc chloride, zinc sulfate or sodium sulfate, to a pH of 2 to 7.5, and preferably 4 to 7.5. Before the coagulant is added there is added to the latex a sensitizing agent such as (1) the reaction product of a polyalkylene oxide and a coupling agent such as a diepoxide, a diamine or a diisocyanate, (2) polyethylene-polypropylene oxide block copolymer or (3) polyethylene oxide. Substantially complete coagulation is effected, and the serum which results on separation of the coagulum is almost entirely free of elastomer.

PROCESS FOR COAGULATING A LATEX OF AN ELASTOMER POLYMER

Original Filed Aug. 28, 1967